(12) United States Patent
Davey (10) Patent No.: US 10,215,155 B2
(45) Date of Patent: Feb. 26, 2019

(54) WIND TURBINE BLADE MANUFACTURE (71) Applicant: Vestas Wind Systems A/S, Aarhus N. (DK)

(72) Inventor: Chris Davey, Salisbury (GB)

(73) Assignee: Vestas Wind Systems A/S, Aarhus N. (DK)

( * ) Notice: Subject to any disclaimer, the term of this patent is extended or adjusted under 35 U.S.C. 154(b) by 295 days.

(21) Appl. No.: 15/302,105

(22) PCT Filed: Apr. 1, 2015

(86) PCT No.: PCT/DK2015/050078
§ 371 (c)(1),
(2) Date: Oct. 5, 2016

(87) PCT Pub. No.: WO2015/154776
PCT Pub. Date: Oct. 15, 2015

(65) Prior Publication Data
US 2017/0145987 A1    May 25, 2017

(30) Foreign Application Priority Data
Apr. 8, 2014  (GB) .................................. 1406327.5

(51) Int. Cl.
*F03D 1/06* (2006.01)
*F03D 80/00* (2016.01)
*F03D 80/70* (2016.01)

(52) U.S. Cl.
CPC ........... *F03D 1/0675* (2013.01); *F03D 80/00* (2016.05); *F03D 80/70* (2016.05);
(Continued)

(58) Field of Classification Search
CPC .. B23P 9/00; B23P 15/02; B23P 15/04; B29C 64/188; B29C 66/02245; B29C 70/545;
(Continued)

(56) References Cited

U.S. PATENT DOCUMENTS

| 4,420,354 A | 12/1983 | Gougeon et al. |
| 2009/0114337 A1* | 5/2009 | Llorente Gonzalez ..................... B29C 70/32 156/185 |

FOREIGN PATENT DOCUMENTS

| WO | 2007073735 A1 | 7/2007 |
| WO | 2012100772 A1 | 8/2012 |
| WO | 2012140039 A2 | 10/2012 |

OTHER PUBLICATIONS

Intellectual Property Office, Search Report in Application No. GB1406327.5, dated Jul. 30, 2014.
(Continued)

*Primary Examiner* — Jason L Vaughan
*Assistant Examiner* — Amanda J Meneghini
(74) *Attorney, Agent, or Firm* — Wood Herron & Evans LLP (57) ABSTRACT

A method of making a root end of a wind turbine blade is described. The root end has a root end surface that connects to a wind turbine hub via a pitch bearing when the blade is installed on a wind turbine, and the method comprises providing a plurality of bores in the root end of the blade, each bore extending axially into the blade and having an opening defined at the root end surface; providing a plurality of plugs, each plug having a substantially solid first end portion; inserting the plugs into the respective bores each to a depth whereby the first end portions of the respective plugs extend inside the bores and form a seal against an internal surface of the bore and a sacrificial portion of the first end portion of each plug protrudes from the opening of the respective bore at the root end surface; and machining the root end surface to form a substantially flat root end surface for interfacing with the pitch bearing, wherein the step of machining the root end surface comprises removing the protruding sacrificial portions of the protruding plugs leav-
(Continued)

ing the remaining first end portions of the respective plugs substantially flush with the root end surface.

11 Claims, 5 Drawing Sheets

(52) U.S. Cl.
CPC ....... *F05B 2230/10* (2013.01); *F05B 2230/50* (2013.01); *F05B 2240/57* (2013.01); *F05B 2260/02* (2013.01); *Y02E 10/721* (2013.01); *Y02P 70/523* (2015.11)

(58) Field of Classification Search
CPC ........... B29C 2059/027; B29C 2793/00; B29L 2031/085; F01D 5/12; F01D 5/14; F01D 5/147; F01D 5/18; F01D 5/30–5/326; F03D 1/0633; F03D 1/065; F03D 1/0658; F03D 1/0675; F03D 3/064; F03D 13/00; F03D 13/10; F03D 13/40; F03D 80/55; F03D 80/70; F05B 2230/10; F05B 2230/50; F05B 2230/60; F05B 2240/21; F05B 2240/57; Y02E 10/721; Y02P 70/523
USPC ....................... 29/889, 889.2, 889.21, 889.6, 29/889.7–889.722; 264/138, 162, 344, 264/678; 290/44, 55; 416/132 B, 416/204 R–222, 223 R, 231 R, 232, 248
See application file for complete search history.

(56) References Cited

OTHER PUBLICATIONS

European Patent Office, Search Report and Written Opinion in PCT Application No. PCT/DK2015/050078, dated Sep. 9, 2015.
European Patent Office, Invitation to Pay Additional Fees in PCT Application No. PCT/DK2015/050078, dated Jun. 16, 2015.

* cited by examiner

WIND TURBINE BLADE MANUFACTURE

TECHNICAL FIELD

The present invention relates generally to the manufacture of wind turbine blades, and more specifically to a method of manufacturing a root end of a blade and a device for use in the method to prevent debris from accumulating inside bores defined in the root end of the blade.

BACKGROUND

Modern wind turbine blades are typically moulded from composite materials such as glass-fibre reinforced plastics (GFRP). The blades extend longitudinally from a generally circular root end towards a tip end.

Figure 1:
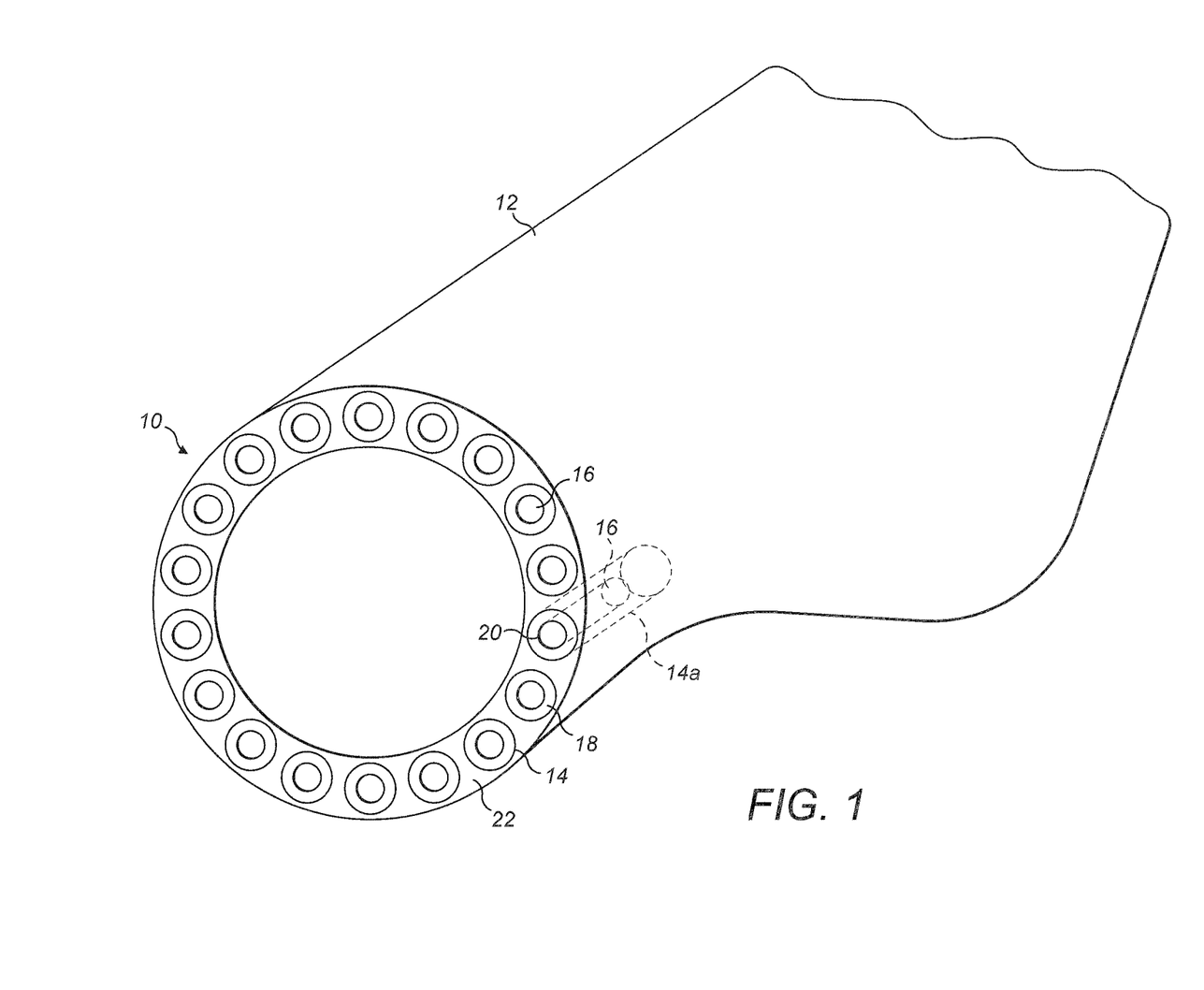

FIG. 1 shows the root end 10 of a typical wind turbine blade 12. A plurality of metal root inserts 14 are embedded in the root end 10 of the blade 12. The root inserts 14 are substantially tubular and of circular cross section. The root inserts 14 extend axially into the root end of the blade, as shown by way of example by the dashed lines 14a. Each insert 14 defines a longitudinal bore 16, which has an internal thread. The inserts 14 are equally spaced around the circumference of the root end 10. The inserts 14 each have a flat annular end surface 18 surrounding and defining the opening 20 of the bore 16. The flat end surfaces 18 of the inserts 14 lie flush with the annular root end surface 22 of the blade 12.

The root inserts are used for connecting the blade to a pitch bearing mounted to the hub when the blade is installed on a wind turbine. Stud bolts are used to secure the blade to the pitch bearing, with the bolt shafts being received within the threaded bores of the inserts. The inserts are also used during manufacture of the blade to support the blade during the moulding process. In this respect, the root end of the blade is secured to a mount located at one end of the blade mould by means of studs that protrude from the mount into the bores. Copper grease is applied to the studs and to the bores to enable the root end of the blade to be released from the studs when the blade is removed from the mould.

Once the blade has been removed from the mould, the root end of the blade is machined to provide a flat level surface, which forms the interface with the pitch bearing. An orbital milling machine is used for this purpose, and typically one or two millimeters of material is removed from the root end to form the required flat surface.

A problem associated with the milling process is that the swarf produced during milling tends to accumulate inside the bores of the root inserts. This problem is exacerbated by the presence of the copper grease inside the bores to which the swarf sticks, thus making it very difficult to remove the swarf from the bores after the milling process.

Prior to the blades leaving the factory, each root insert undergoes a thorough cleaning process to remove any debris or swarf from the bores. As each blade includes a large number of root inserts, this cleaning process is both time consuming and expensive. It is also difficult to verify the cleanliness of the bores after the cleaning process, and so there remains the possibility that small amounts of debris may remain in one or more of the bores even after the cleaning process, or worse that one of the bores may accidentally have been omitted altogether from the cleaning process.

Once the bores have been cleaned, a tubular bung is inserted into each bore. The bung has a threaded outer surface and is screwed into the bore. The bung includes an integral end cap having a circumferential flange which overlies the machined annular surface of the root insert when the bung is inserted into the bore. A washer is typically provided between the flange and the annular surface. The bung prevents debris from entering the bore during storage and transportation of the blade, whilst the washer and flange serve to protect the annular surface of the root insert. The bung is removed immediately prior to installation of the blade.

Connecting the blades to the hub is a difficult and expensive process at the best of times. However, if the cleaning process described above has not been sufficiently thorough then it is possible that debris may still be present inside the bores at the time of installation. The debris may prevent the stud bolt from fastening correctly inside the bore or in some cases it may cause the bolt to become stuck inside the bore. The presence of debris inside the bores at the time of installation is therefore a serious problem and will delay, and in some cases prevent, the installation of the blade.

The present invention aims to overcome one or more of the problems described above.

SUMMARY OF THE INVENTION

According to a first aspect of the present invention, there is provided a method of making a root end of a wind turbine blade, the root end having a root end surface that connects to a wind turbine hub via a pitch bearing when the blade is installed on a wind turbine, and the method comprising:
 (a) providing a plurality of bores in the root end of the blade, each bore extending axially into the blade and having an opening defined at the root end surface;
 (b) providing a plurality of plugs, each plug having a substantially solid first end portion;
 (c) inserting the plugs into the respective bores each to a depth whereby the first end portions of the respective plugs extend inside the bores and form a seal against an internal surface of the bore and a sacrificial portion of the first end portion of each plug protrudes from the opening of the respective bore at the root end surface; and
 (d) machining the root end surface to form a substantially flat root end surface for interfacing with the pitch bearing, wherein the step of machining the root end surface comprises removing the protruding sacrificial portions of the protruding plugs leaving the remaining first end portions of the respective plugs substantially flush with the root end surface.

According to the present invention, the plugs are inserted into the bores prior to the machining process. The plugs block the bores and advantageously prevent swarf from entering the bores during the milling process. There is therefore no need to clean the bores after the milling process, and hence the invention represents a significant improvement in the manufacturing process. The plugs remain in place until the time of blade installation, at which point the plugs are removed. The bores are perfectly clean at the time of installation as there is no possibility of swarf being present inside the bores.

After the root end surface has been machined, a cap may be attached to the first end portion of each plug. The cap preferably has a body that substantially covers a peripheral portion of the root end surface surrounding the bore. The bores are preferably provided in respective root inserts embedded in the root end of the blade, and the peripheral portions of the root end surface are preferably defined by end surfaces of the root inserts. These end surfaces are machined along with the root end of the blade, and it is important that these surfaces are flat and clean when the blade is installed as they form the interface with the pitch bearing. A washer is preferably provided between the body of the cap and the peripheral end surface surrounding the bore. The washer and/or the body of the cap conveniently serve to protect the machined peripheral surface surrounding the bore during transportation and storage of the blade, thus ensuring that the surface is both clean and flat when the blade is installed.

The first end portion of each plug may include a first recess for receiving an insertion portion of the cap. The first recess preferably extends axially into the first end portion. The plugs are preferably inserted in the respective bores to a depth whereby the first recess extends above and below the root end surface. When the sacrificial portions of the respective plugs are removed, the first recess is exposed at the root end surface. The first recess extends axially into the remaining portion of the plug located within the bore. The caps may then be attached to the plugs by inserting the insertion portions of the respective caps into the first recesses in the remaining first end portions of the respective plugs.

In preferred embodiments of the invention, the caps may be locked to the respective plugs. This may be achieved by means of interlocking features associated respectively with the insertion portions of the caps and the first recesses of the plugs. The interlocking features may permit attachment of the cap to the plug and substantially prevent removal of the cap from the plug. The interlocking features advantageously prevent the caps from being dislodged or otherwise separated from the plugs.

Preferably the bores are threaded and the plugs include a threaded outer surface. The method may therefore involve screwing the plugs inside the bores such that the threads on the plugs mate with the threads inside the bores.

The first end portion of each plug may include a second recess for receiving a tool. The second recess preferably extends axially into the first end portion of the plug. Accordingly, the method may comprise inserting the plugs inside the respective bores to a depth whereby the second recess extends above and below the root end surface. When the sacrificial portions of the respective plugs are removed, the second recess is exposed at the root end surface. The second recess extends into the portion of the plug remaining inside the bore so that a tool can be inserted into the second recess after machining the sacrificial end portion of the plug.

During the initial insertion process, the method may involve inserting a tool into the second recess and turning the plug with respect to the bore using the tool. In order to remove the plug from the bore, the method may again involve inserting a tool into the second recess and turning the plug in the opposition direction, for example to unscrew the plug from the bore. The body of the travel cap may include an aperture that overlies the second recess. The step of removing the plugs from the bores may accordingly involve inserting the tool through this aperture and into the second recess.

According to a second aspect of the present invention, there is provided a plug having a first end portion and a second end portion and being configured for insertion into a bore defined in a wind turbine component such that the second end portion of the plug can be located completely inside the bore and the first end portion of the plug can be located partly inside the bore with a sacrificial portion of the first end portion protruding from the bore, wherein the first end portion of the plug is substantially solid and includes one or more recesses extending axially into the first end portion to a depth whereby when the plug is inserted into the bore in use, the or each recess extends above and below a surface in which an opening of the bore is defined, and wherein the first end portion of the plug is configured to form a seal against an internal surface of the bore to prevent debris from entering the bore during machining of the surface and of the protruding sacrificial portion of the plug.

The plug preferably comprises a first recess extending axially into the first end portion. The first recess may advantageously be shaped to receive an insertion portion of a cap to be fitted to the first end portion of the plug. The first recess is preferably substantially annular, and may be configured to receive a substantially tubular insertion portion of the cap.

The first recess may comprise one or more interlocking features for engaging one or more interlocking features provided on the insertion portion of the cap. The interlocking features may be configured to permit insertion of the insertion portion of the cap into the first recess and substantially to prevent removal of the cap from the plug. In a preferred embodiment, the first recess is configured to form a snap fit with the insertion portion of the cap.

The plug may include a second recess extending axially into the first end portion. The second recess may be shaped to receive a tool. In a preferred embodiment, the second recess has a hexagonal cross section for receiving a hex key or Allen key.

The second end portion of the plug may be substantially tubular. This is advantageous as it reduces the material cost of the plug in comparison to a solid portion. The second end portion may have a thread provided on its outer surface.

Preferably the plug is substantially circular in cross section. The plug may be made from any suitable material, for example plastic, rubber, metal or composite material. In preferred embodiments the plug is made from polyamide plastic. Preferably the plug is a single moulding.

According to a third aspect of the present invention, there is provided a cap having a body and an insertion portion projecting from the body, the insertion portion being configured for insertion into a recess defined in the first end portion of the plug, and the body being arranged to overlay a peripheral region of a surface surrounding a bore in which the plug is inserted in use.

The insertion portion of the cap is preferably substantially tubular, and preferably the recess in the plug is substantially annular. Other arrangements are possible, for example the insertion portion may comprise one or more legs for insertion into one or more recesses in the plug. However, the tubular insertion portion and annular recess arrangement is particularly convenient because it permits connection of the two parts in any circumferential orientation, and so precise alignment between the two components is not required.

The insertion portion may comprise one or more interlocking features for engaging with one or more interlocking features provided in the recess of the plug. The interlocking features may be configured to permit insertion of the insertion portion of the cap into the recess and prevent removal of the insertion portion from the recess. The insertion portion may be configured to form a snap fit with the recess of the plug. In a preferred embodiment, the insertion portion includes a series of teeth for engaging with interlocking features of the recess.

The cap may be made from any suitable material, for example plastic, rubber, metal or composite material. In preferred embodiments the cap is made from polyamide plastic. Preferably the cap is a single moulding.

Optional features described in relation to one aspect of the invention are equally applicable to the other aspects of the invention, and repetition of such features has been avoided where possible solely for reasons of conciseness.

BRIEF DESCRIPTION OF THE DRAWINGS

FIG. 1 has already been described above by way of background to the present invention. In order that the present invention may be more readily understood, an embodiment of the invention will now be described, by way of example only, with reference to the following figures, in which:

DETAILED DESCRIPTION

Figure 2:
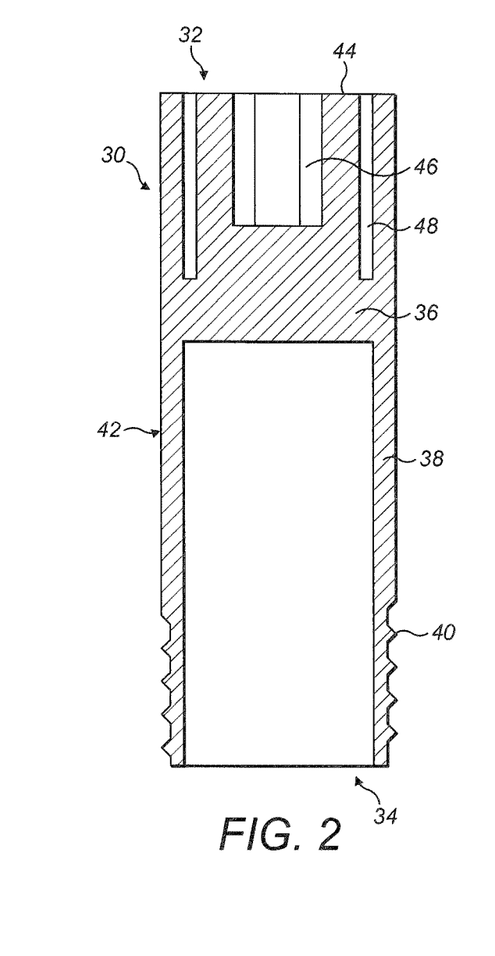
FIG. 2 is a schematic cross-sectional view of a plug according to an embodiment of the present invention.

FIG. 2 shows a plug 30 according to an embodiment of the present invention. The plug 30 is also referred to as a 'bung'. The plug 30 is elongate and generally circular in cross-section. The plug 30 extends axially between a first end 32 and a second end 34. The first end 32 is closed and is defined by a substantially solid and cylindrical first end portion 36 of the plug 30. The second end 34 is open and is defined by a tubular second end portion 38 of the plug 30. A male thread 40 is provided on an outer surface 42 of the tubular portion 38 of the plug 30. The plug 30 in this example is moulded in one piece from polyamide plastic (Nylon®).

Figure 3:
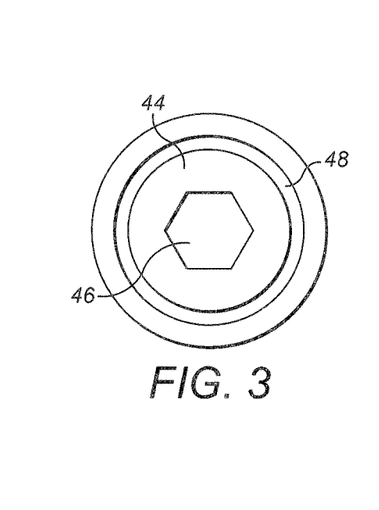
FIG. 3 is a plan view of a first end surface of the plug of FIG. 2.

The solid first end portion 36 of the plug 30 defines a first end surface 44 of the plug 30, which is substantially flat. The first end surface 44 is shown in plan view in FIG. 3. Referring to FIG. 3, a hexagonal recess 46 having a diameter of approximately 20 mm is defined in the centre of the first end surface 44, and this is surrounded by a narrow annular recess 48. Referring again to the cross-sectional view of FIG. 2, in this example the hexagonal recess 46 extends into the solid end portion 36 to a depth of approximately 12 mm, whilst the annular recess 48 extends to a depth of approximately 15 mm.

Figure 4:
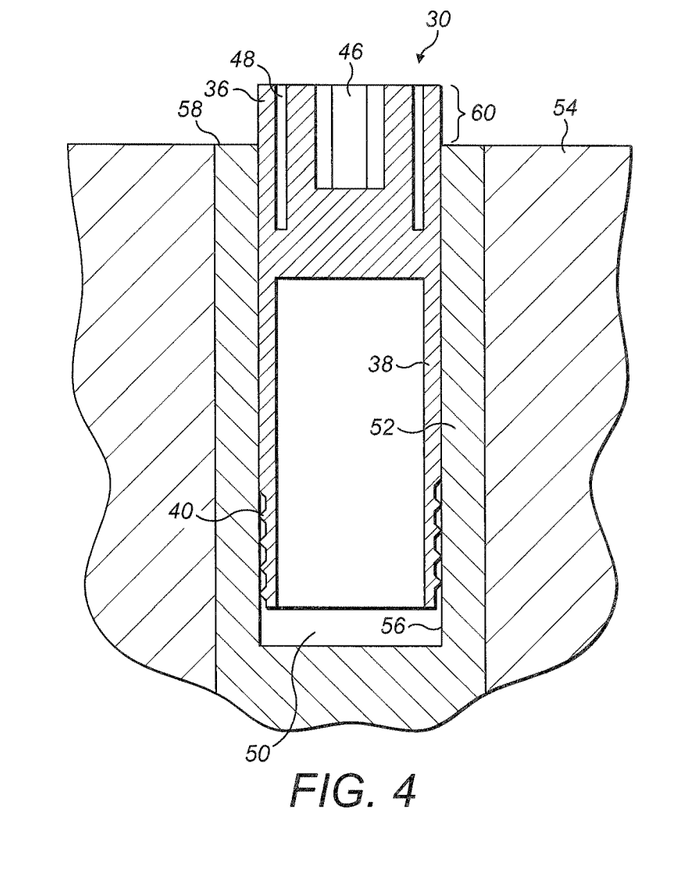
FIG. 4 shows the plug inserted into a bore at a root end of a wind turbine blade with a sacrificial portion of the plug protruding from the root end.

Referring now to FIG. 4, this shows the plug 30 inserted into a bore 50 defined in a metal root insert 52 which is embedded in a root end 54 of a wind turbine blade. Prior to machining the root end 54 of the blade, the plug 30 is screwed into the bore 50 such that the male thread 40 on the tubular portion 38 of the plug 30 mates with a female thread provided on an internal surface 56 of the bore 50. The female thread is not shown in these schematic illustrations.

The plug 30 is screwed to a depth whereby the hexagonal and annular recesses 46, 48 in the solid end portion 36 of the plug 30 extend both above and below the annular end surface 58 of the root insert 52. The terms 'above' and 'below' used herein refer to the bore 50 when in the orientation shown in the drawings. Expressed in other terms, the respective recesses 46, 48 extend both into and out of the bore 50. In this way, a so-called 'sacrificial portion' 60 of the solid first end portion 36 of the plug 30 protrudes above the end surface 58 of the root insert 52 (i.e. protrudes out of the bore 50).

Typically the plug 30 is screwed to a depth such that about 2-3 mm of the plug 30 protrudes above the end surface 58 of the insert 52, i.e. such that the sacrificial portion 60 of the plug has a height of about 2-3 mm. However, the exact amount by which the plug 30 protrudes from the end surface 58 is not critical provided that the recesses 46, 48 extend below the end surface 58 of the root insert 52 (i.e. provided that the recesses 46, 48 extend into the bore 50). In this way there is a large tolerance on the depth to which the plugs 30 can be screwed into the bores 50, which conveniently facilitates the process of inserting the plugs 30 into the bores 50. Advantageously a minimum depth marker may be applied for example to the side surface of the solid end portion 36 of the plug 30 to indicate the minimum depth to which the plug 30 must be inserted to ensure that the recesses 46, 48 extend sufficiently into the bore 50.

Figure 5:
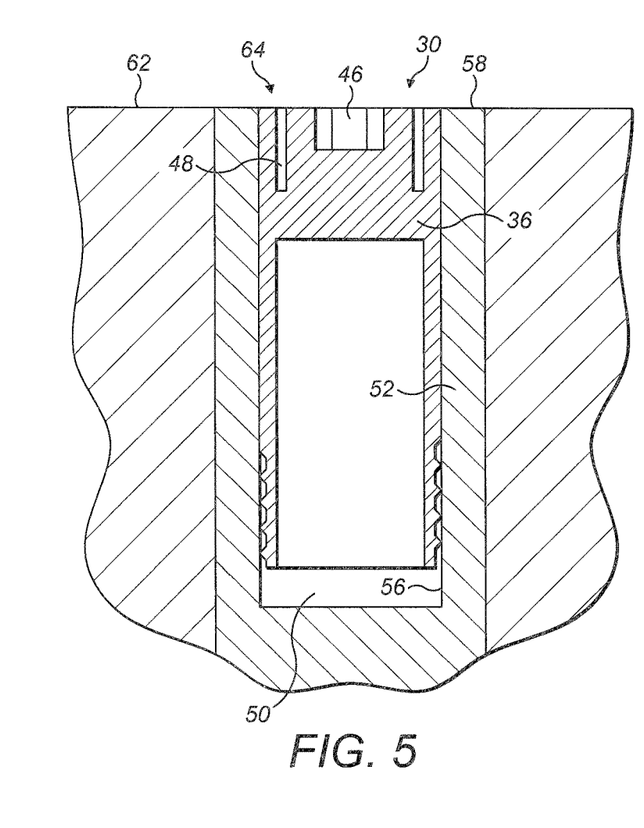
FIG. 5 shows the plug inside the bore after the root end the sacrificial portion of the plug have been milled.

A similar plug 30 is inserted into each of the bores 50 defined in the respective root inserts 52 at the root end 54 of the blade. Once all of the plugs 30 have been inserted, the root end 54 of the blade is milled (as described by way of background) to form a flat surface 62 to interface with the hub. Referring now to FIG. 5, during the milling process, the sacrificial portion 60 (FIG. 4) of each plug 30 is removed by the milling machine to form a new first end 64 of the plug 30 which lies flush with the milled root end surface 62 of the blade.

The solid end 36 of the plug 30 forms a seal against the side wall 56 of the bore 50 and thus prevents swarf from entering the bore 50 during the milling process. Once the milling process is complete, swarf is removed from the hexagonal and annular recesses 46, 48 in the solid portion 36 of the plug 30. The swarf in these recesses 46, 48 has not come into contact with any grease and so can easily be blown out of the recesses 46, 48. The milled end surfaces 58 of the root inserts 52 are then cleaned.

Figure 6A:
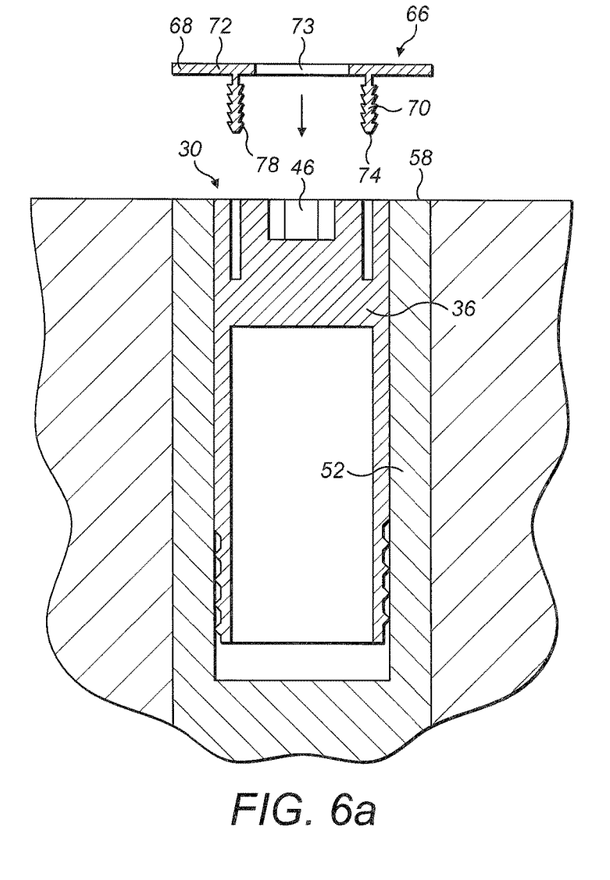
FIG. 6a shows a travel cap to be fitted to the milled end of the plug.
Figure 6B:
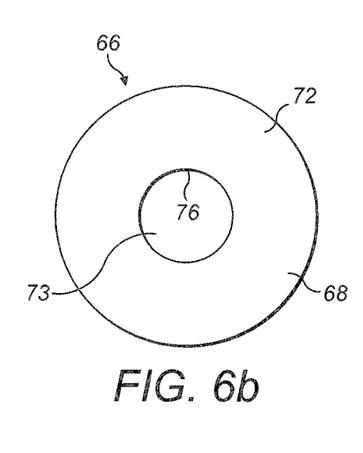
FIG. 6b is a plan view showing a body of the travel cap.

Referring to FIG. 6a, in order to protect the flat end surfaces 58 of the root inserts 52 during storage and transportation of the blade, a travel cap 66 is inserted into the solid end 36 of the plug 30. Referring also to FIG. 6b, which is a plan view of the travel cap 66, the travel cap 66 is generally top-hat shaped, and comprises a body 68 and an insertion portion 70. The body 68 comprises an annular disc 72 defining a central circular aperture 73, and the insertion portion 70 comprises a tubular wall 74 that extends from an inner periphery 76 of the disc 72 in a direction perpendicular to the plane of the disc 72. A series of teeth 78 or barbs are provided on the tubular wall 74. The barbs 78 are annular projections which are substantially triangular in cross section. The travel cap 66 is moulded as a single piece from polyamide plastic (Nylon®).

Figure 6C:
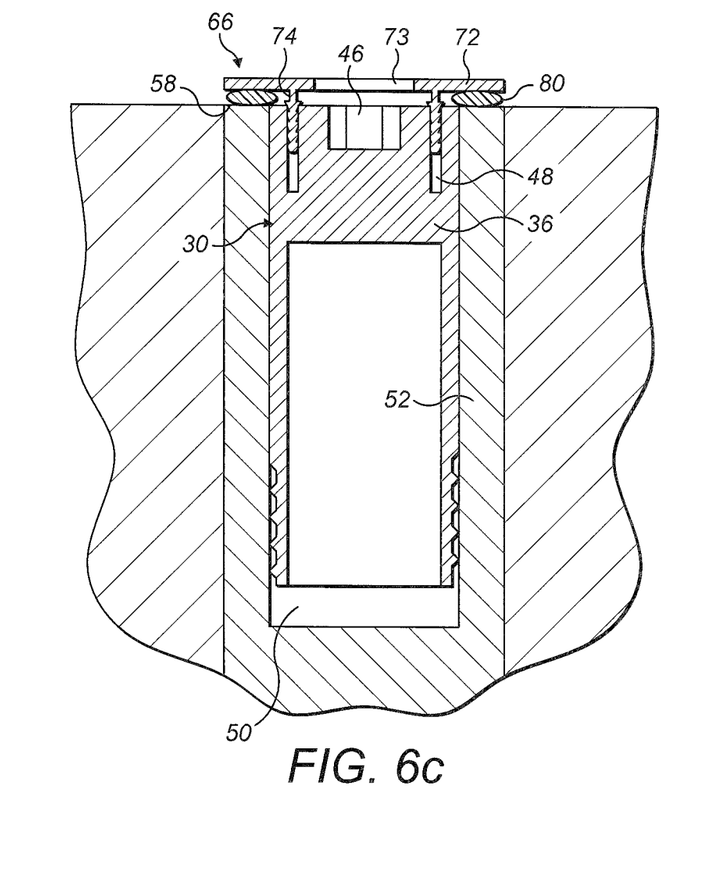
FIG. 6c shows the travel cap fitted to the plug.

Referring to FIG. 6c, an annular washer 80 is placed on the milled end surface 58 of the root insert 52 surrounding the bore 50, and the tubular wall 74 of the travel cap 66 is inserted into the annular recess 48 defined in the solid first end portion 36 of the plug 30. The annular disc 72 of the travel cap 66 seals against the washer 80 and thereby serves to protect the milled end face 58 of the root insert 52 during transportation and storage of the blade.

Figure 6D:
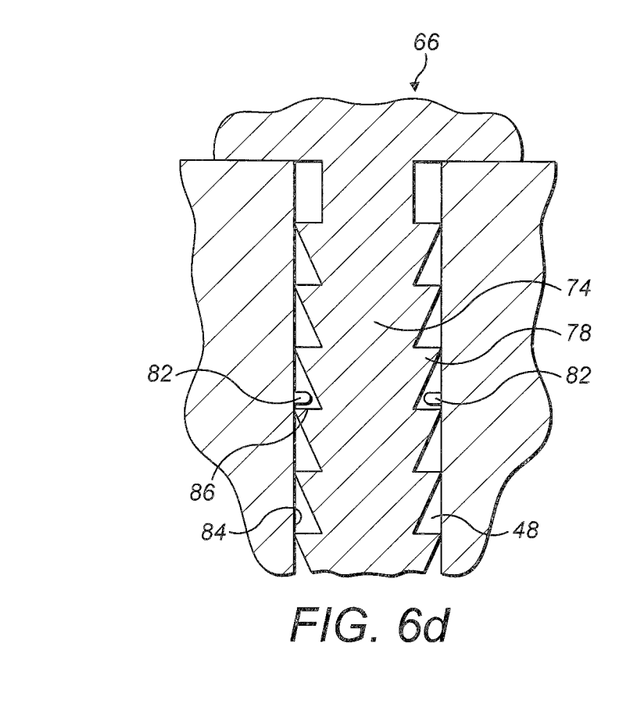
FIG. 6d shows a close-up cross-sectional view of part of the travel cap.

Referring to FIG. 6d, which is a close-up cross-sectional view of part of the tubular wall 74 of the travel cap 66 inserted into the annular recess 48, here it can be seen that a pair of opposed ribs 82 protrude from the side wall 84 of the annular recess 48. The barbs 78 provided on the tubular wall 74 of the travel cap 66 ride over the ribs 82 when the travel cap 66 is inserted into the plug 30. The travel cap 66 is pushed firmly against the end surface 58 of the root insert 52, which causes several of the barbs 78 to ride over the ribs 82. Once pushed firmly into the plug 30, a flat back surface 86 of one of the barbs 78 locks against the ribs 82 and prevents the travel cap 66 from being removed from the plug 30. The barbs 78 and ribs 82 together form a snap fit and keep the travel cap 66 pressed firmly against the root insert 52 and prevent it from being removed or dislodged.

The plug 30 and travel cap 66 assembly remains in place until such time as the blade is installed on a wind turbine hub. Immediately prior to installation of the blade, the plug and cap assembly is removed using a suitable tool such as a hex key or 'Allen key'. The hex key is inserted through the circular aperture 73 defined in the centre of the travel cap 66 (see FIG. 6b), and into the hexagonal recess 46 defined in the centre of the solid portion 36 of the plug 30. The hex key is then turned anticlockwise to turn the plug 30 inside the bore 50, thus allowing the plug 30 to be removed.

Once the plugs 30 have been removed, stud bolts are used to connect the blade to the hub, with the bolts being received in the bores 50 of the root inserts 52. As the bores 50 were firmly plugged during the machining process, there is no possibility of swarf being present inside the bores 50 at the time of installation. Furthermore, as the plugs 30 remain inside the bores 50 until the blade is ready for installation, the plugs 30 prevent any debris from entering the bores 50 after the manufacturing process, i.e. during storage and transportation of the blade. Installation of the blades is therefore facilitated by virtue of the perfectly clean bores 50. The blade manufacturing process is also simplified as it is no longer necessary to clean the bores 50 after the machining process, which was a time consuming task.

The present invention may be employed in the manufacture of a wind turbine blade in which the root end of the blade is formed integrally with the remainder of the blade. Equally, the present invention may be employed in the manufacture of modular blades in which the root end of the blade is manufactured separately to other sections of the blade and later joined together to form a complete blade.

Many modifications may be made to the example described above without departing from the scope of the present invention as defined in the accompanying claims. For example, whilst part of the plug described above is tubular, in other embodiments the entire plug may be solid. A tubular second end portion is advantageous however as it reduces the material cost of the plug. The specific dimensions provided above are by way of example only and are not intended to limit the scope of the invention. In other examples the recesses may have different depths for example. Whilst a series of teeth are provided on the travel cap in the above example, in other embodiments the teeth may be provided inside the annular recess, for example, or other interlocking formations may be employed. Whilst the bores described above are defined in root inserts, it will be appreciated that the plug and travel cap of the present invention may be suitably sized for insertion into other bores to prevent debris from accumulating in those bores.

What is claimed is:

1. A method of making a root end of a wind turbine blade, the root end having a root end surface that connects to a wind turbine hub via a pitch bearing when the blade is installed on a wind turbine, and the method comprising:
   (a) providing a plurality of bores in the root end of the blade, each bore extending axially into the blade and having an opening defined at the root end surface;
   (b) providing a plurality of plugs, each plug having a substantially solid first end portion;
   (c) inserting the plugs into the respective bores each to a depth whereby the first end portions of the respective plugs extend inside the bores and form a seal against an internal surface of the bore and a sacrificial portion of the first end portion of each plug protrudes from the opening of the respective bore at the root end surface; and
   (d) machining the root end surface to form a substantially flat root end surface for interfacing with the pitch bearing, wherein the step of machining the root end surface comprises removing the protruding sacrificial portions of the protruding plugs leaving the remaining first end portions of the respective plugs substantially flush with the root end surface.

2. The method of claim 1, wherein after step (d) the method further comprises attaching a cap to the first end portion of each plug, the cap having a body that substantially covers a peripheral portion of the root end surface surrounding the bore.

3. The method of claim 2, further comprising providing a washer between the body of the cap and the peripheral portion of the root end surface.

4. The method of claim 2, wherein the first end portion of each plug includes a first recess for receiving an insertion portion of the cap, the first recess extending axially into the first end portion, and step (c) of the method comprises inserting the plugs inside the respective bores to a depth whereby the first recess extends above and below the root end surface such that when the sacrificial portions of the respective plugs are removed, the first recess is exposed at the root end surface, and wherein the step of attaching the caps to the plugs comprises inserting the insertion portions of the respective caps inside the first recesses of the respective plugs.

5. The method of claim 4, wherein the method further comprises locking the caps to the respective plugs by means of interlocking features associated respectively with the insertion portions of the caps and the first recesses of the plugs, wherein the interlocking features permit attachment of the cap to the plug and substantially prevent removal of the cap from the plug.

6. The method of claim 1, wherein the bores are threaded and the plugs include a threaded outer surface, and step (c) of the method involves screwing the plugs inside the bores such that the threads on the plugs mate with the threads inside the bores.

7. The method of claim 1, wherein the first end portion of each plug includes a second recess for receiving a tool, the second recess extending axially into the first end portion, and step (c) of the method comprises inserting the plugs inside the respective bores to a depth whereby the second recess extends above and below the root end surface such that when the sacrificial portions of the respective plugs are removed the second recess is exposed at the root end surface.

8. The method of claim 7, wherein step (c) of the method comprises inserting a tool into the second recess and turning the plug with respect to the bore using the tool.

9. The method of claim 7, wherein after step (d) the method further comprises removing the plugs from the bores by inserting a tool into the second recess of the respective plugs and using the tool to turn the plugs inside the bores.

10. The method of claim 7, wherein after step (d) the method further comprises attaching a cap to the first end portion of each plug, the cap having a body that substantially covers a peripheral portion of the root end surface surrounding the bore, and wherein the body of the cap comprises an aperture that overlies the second recess and the step of removing the plugs from the bores comprises inserting the tool through the aperture in the cap and into the second recess defined in the first end of the plug.

11. The method of claim 1, wherein the bores are provided respectively in root inserts embedded in the root end of the blade.

\* \* \* \* \*